United States Patent
Agúndez Dominguez et al.

(10) Patent No.: US 9,225,829 B2
(45) Date of Patent: Dec. 29, 2015

(54) METHOD AND SYSTEM FOR PROVIDING COMMUNICATION PARTY RELATED INFORMATION

(75) Inventors: Jose Luis Agúndez Dominguez, Madrid (ES); Jesus Renero Quintero, Getafe (ES)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 1038 days.

(21) Appl. No.: 12/741,943

(22) PCT Filed: Nov. 8, 2007

(86) PCT No.: PCT/EP2007/062066
§ 371 (c)(1),
(2), (4) Date: May 7, 2010

(87) PCT Pub. No.: WO2009/059637
PCT Pub. Date: May 14, 2009

(65) Prior Publication Data
US 2010/0241719 A1    Sep. 23, 2010

(51) Int. Cl.
| | | |
|---|---|---|
| G06F 15/16 | (2006.01) | |
| H04M 3/42 | (2006.01) | |
| G06Q 10/10 | (2012.01) | |
| H04L 12/58 | (2006.01) | |

(52) U.S. Cl.
CPC .......... *H04M 3/4211* (2013.01); *G06Q 10/107* (2013.01); *H04L 51/04* (2013.01); *H04L 51/28* (2013.01); *H04M 3/42068* (2013.01); *H04L 51/32* (2013.01); *H04M 2203/655* (2013.01)

(58) Field of Classification Search
None
See application file for complete search history.

(56) References Cited

U.S. PATENT DOCUMENTS

| | | | |
|---|---|---|---|
| 2005/0120084 A1 | 6/2005 | Hu et al. | |
| 2007/0067451 A1* | 3/2007 | Oshiba | 709/224 |
| 2007/0143500 A1* | 6/2007 | Wilhelm | 709/245 |
| 2008/0005229 A1* | 1/2008 | Cohen et al. | 709/203 |

FOREIGN PATENT DOCUMENTS

WO    WO 01/72002 A    9/2001

* cited by examiner

*Primary Examiner* — Brian P Whipple (57) ABSTRACT

Method of sharing contact lists, address books, buddy list between users that subscribe to a social networking service via voice calls, data calls, (SMS/MMS) or instant messages/chat. Alledged goal is to provide an improved mechanism of providing communication party related information similar to caller ID for voice calls, the information being more than the telephone number. Only example given of this information is number, name, relationship and degree of seperation.

18 Claims, 8 Drawing Sheets

| Party ID | Name | Relationship | Degree of separation | ... |
|---|---|---|---|---|
| +4912345678 | Paul | Friend | 2 | ... |
| −3498765432 | Alice | Colleague | 3 | ... |
| ... | ... | ... | ... | ... |

| Party ID | Name | Relationship | Degree of separation | ... |
|---|---|---|---|---|
| +4912345678 | Paul | Friend | 2 | ... |
| +3498765432 | Alice | Colleague | 3 | ... |
| ... | ... | ... | ... | ... |

METHOD AND SYSTEM FOR PROVIDING COMMUNICATION PARTY RELATED INFORMATION

BACKGROUND

The present application lies in the field of providing communication party related information to a party of a communication that comprises a first and a second party.

Examples of such communications are a voice call (such as a telephone call over a telephone network), a data call (such as an email communication or an SMS (short message service)/MMS (multimedia message service) message) or a real-time chat.

In the field of communication it is known to provide a party identifier of one party of a communication to the other. For example, when a communication between two parties, A and B, is established in a telecommunication network, a mechanism for forwarding identification information between the e.g. calling party A and the e.g. called party B takes place. For example, this party identifier or identification information can be the telephone number of the calling party. The identification information helps the called party to identify who is calling. The same concept is also known for data calls, such as sending emails (the identifier being an email address), instant messages or real-time chat (the identifier usually being some form of nickname or alias defined within the instant messaging service), SMS/MMS messages (the identifier usually being a telephone number or an email address). In telephone networks this mechanism is also known as a Caller Identification Service (Call-ID).

It is furthermore known to provide a dedicated application in communication equipment (e.g. mobile phones) for mapping the party identifier against a contact list or contact database in which party identifiers are associated with further party information, such as a name, a nickname, a photograph, a ring-tone, etc.

Such contact lists are customized by the user of the communication equipment. When the respective party receives a party identifier, then the application can take the further party information from the contact list as a form of extended presentation information, such that e.g. a mobile phone will not show the generic telephone number of the calling party, but the customized name from the contact list and/or a photograph associated with the calling party and/or ring with a dedicated ring-tone associated with the calling party. In this way, the called party can readily identify the calling party.

It is known to maintain such contact lists or contact databases within the communication equipment and/or within the communication network in dedicated functions or servers. In the latter case this is also referred to as "network address books" or "network contact lists".

The problem with the above-mentioned known concepts of providing party related information is that typically the party identifier communicated from one party to another or from the network to a party is of generic nature (such as a standardised telephone number), such that in itself it is not very useful for the receiver of the information, unless the receiving party already knows the party identifier in the sense that this party identifier is in the receiving party's contact list or address book.

The object of the present invention is to provide an improved mechanism of providing communication party related information to a party of a communication.

SUMMARY

This object is solved by the subject-matter of the independent claims of the present application. Advantageous embodiments are described in the dependent claims.

According to an aspect to the present invention, a method is proposed for providing communication party related information to a party of a communication that comprises a first and second party, named A and B in the following, where the method comprises a procedure for automatically accessing a contact list of a third party, named C in the following, different from the first and second party, a procedure for automatically deriving an information element on the basis of said contact list and at least one of a party identifier of the first party and a party identifier of the second party, and a procedure for automatically providing the information element to one or both of the first and second party.

Consequently, the present invention establishes the idea of generating information on the basis of a contact list of a third party C different from the two parties A and B involved in a communication, the party C not being involved in the communication, in order to enhance the provision of communication party related information to one or both parties A and B of the communication.

For example, the general concept of the invention can be applied in the situation of providing customized contacting party identification to the contacted party during establishment of a communication. Namely, if the generic contacting party identifier (e.g. the telephone number) is not present in the contact list of the contacted party, then the above-proposed mechanism can be used to query a contact list of a third party different from the two parties involved the communication, in order to extract customized party related information, such as a name and/or address.

According to another example, the general concept of the invention can also be applied in a type of authentication or confirmation service. Namely, one communication party, who has e.g. received from the other communication party an indication that said other party is a friend or acquaintance of a third party, can than request a look-up in the contact list of said third party, in order to determine whether the other party is present there or not.

BRIEF DESCRIPTION OF THE DRAWINGS

The general concept and specific examples of the present invention will now be described with reference to the accompanying drawings, in which.

DETAILED DESCRIPTION

Figure 1:
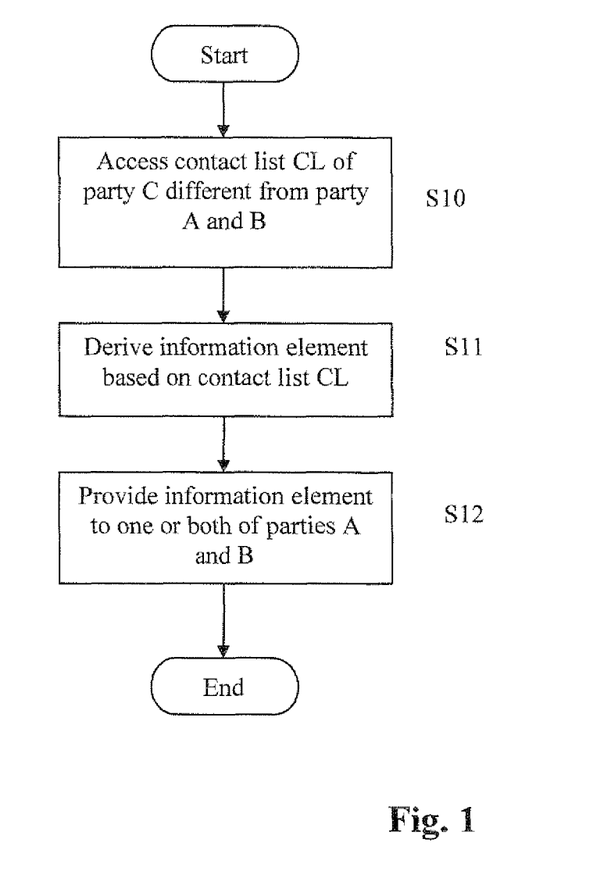
FIG. 1 shows a flow-chart of a basic method embodiment of the invention.

FIG. 1 shows a basic method embodiment of the present invention. In a first step S10 a procedure is conducted for automatically accessing a contact list CL of a third party C different from a first party A and a second party B of a communication. This communication can e.g. be a voice call, a data call or a real-time chat. In step S11 a procedure is conducted for automatically deriving an information element on the basis of the contact list CL and at least one of a party identifier of the first party A, referred to as AI in the following, and a party identifier of the second party B, referred to as DI in the following. For example, if first party A is a contacting party (such as the calling party of a voice call) and party B is a contacted party (such as a called party of a voice call), then the deriving of an information element on the basis of the third party contact list CL may comprise looking up the contacting party identifier AI in the third party contact list CL and deriving as an information element further party related information found in association with the contacting party identification AI in contact list CL, such as a name or address.

Returning to the general example of FIG. 1, the method finally has a step S12, in which a procedure for automatically providing the information element to one or both of the first and second party is conducted. In the above-mentioned example of a contacting party A and a contacted party B, this can e.g. comprise providing the just described information element that contains further party related information found in CL to the contacted party B.

It is noted that the term "contact list" is used generically within the context of the present specification and claims, and relates to any data record that associates a party identifier with further party information, e.g. a telephone number with further information such as name, address, picture element, etc. As a consequence, the generic term contact list therefore extends to records that carry a different name, e.g. an address book.

The term "party" generically describes any entity capable of being considered involved in a communication. As such a party can be the user of a communication system or an apparatus involved in the communication. The party identifier consequently can be any information element capable of identifying a party, such as a telephone number, email address or user name within a given communication context, such as a real-time chat service. Generally, a party identifier can be a Universal Resource Identifier (URI).

The contact lists associated with the parties can be maintained in any suitable or desirable way. For example, they can be maintained in the communication equipment of individual users, e.g. as is known for mobile telephone devices having a contact list or address book. However, the contact lists can also be maintained within a communication network, e.g. in a dedicated server. In this case, the contact lists could be simple copies of the contact lists or address book kept within the communication equipment of individual users, or the server stored contact lists could also be kept according to a separate scheme from that used within the communication equipment. For example, the contact lists could be maintained according to a social networking service, in which users keep contact lists and enter data regarding personal, professional or academic links. Examples of such social networking services are LinkedIn or Xing.

Figure 8:
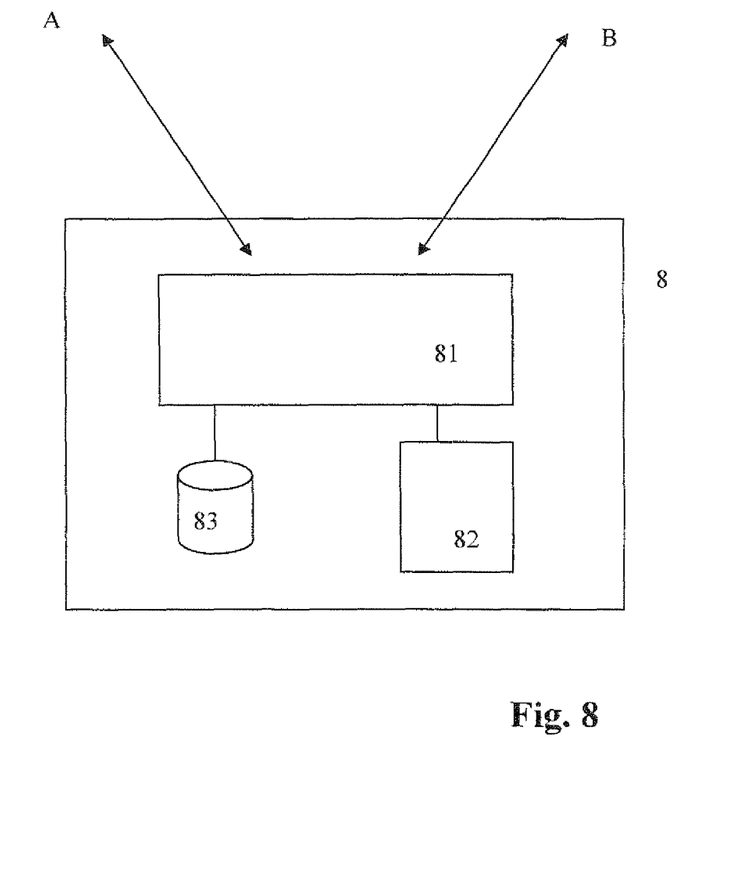
FIG. 8 shows a schematic representation of a network entity according to an embodiment of the present invention.

FIG. 8 shows a schematic representation of a system embodiment of the present invention. Reference numeral 8 represents a network entity, such as a server, that basically comprises a control unit 81 (such as a programmable processor) coupled to a program memory 82 that carries the programs for executing specific procedures on the control unit 81. The example of FIG. 8 furthermore comprises a database 83, in which contact lists of users, such as the shown parties A, B and C are kept. However, it is noted that in addition to or in replacement of database 83, the control unit 81 could also be arranged to query contact lists maintained in other places, i.e. within the communication equipment (such as a mobile phone) of individual users. In other words, in the latter case, both the individual communication devices and control unit 81 comprise data exchange procedures for conducting query and response steps.

The system 8 according to the example of FIG. 8 is arranged for providing communication party related information to one or both parties A and B with the help of the control unit 81, which is arranged for automatically accessing a contact list of a third party different from A and B (e.g. in database 83 or in the communication equipment of the third party), for automatically deriving an information element on the basis of that contact list of the third party and at least one of a party identifier of the first party and the second party. Furthermore, control unit 81 is arranged for automatically providing the information element to one or both of the first and second party A, B.

Figure 6:
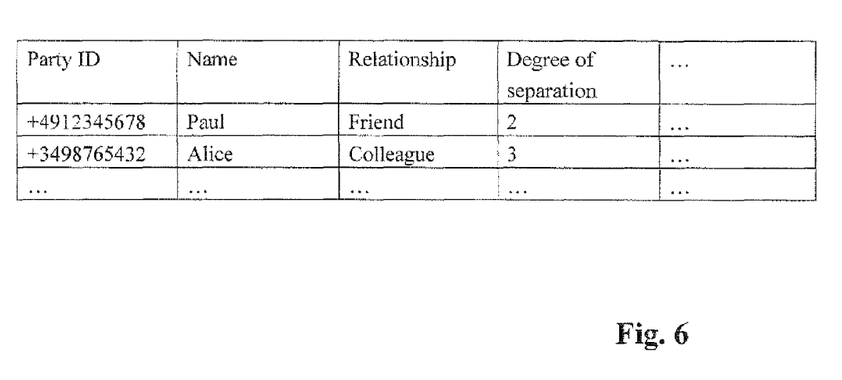
FIG. 6 shows an example of the structure of a contact list.

As already mentioned, the contact list can be kept in any suitable or desirable way, and in any suitable or desirable format. FIG. 6 shows an example, in which a record is kept according to which information in a plurality of fields is stored. The contact list of FIG. 6 comprises a party ID field for receiving party identifiers. In the example of FIG. 6 these are telephone numbers. The contact list of FIG. 6 furthermore comprises a "name" field, a "relationship" field and a "degree of separation" field, where the plurality of fields are linked in tabular form. Naturally, these are only examples, and other types of fields are envisionable. The number of shown fields is also only an example, and as indicated by the dot marking . . . , further fields and further entries are naturally envisionable, as FIG. 6 only shows a simple and schematic example.

FIG. 6 shows the example of a contact list as it might be kept by one of the previously mentioned social networking services, such that it has a field "relationship" indicating the relationship status between the party C owning the contact list and the party identified in the party ID field, as well as a field "degree of separation" that indicates how close the two parties are. More specifically, the degree of separation is an indication whether two people know each other directly (degree of 1) or via other people (degree larger than 1). For example, if a party D knows a party E, and a party F knows party E but not party D, then. D and F are separated to a degree of 2, i.e. one away from knowing each other directly. Similarly, if party D knows party E, and party E knows a party G that in turn knows a party H, where this is the closest link between D and H, then D and H are separated by a degree of 3.

If a contact list has a degree of separation indication, then this can advantageously used in the search strategy for other contacts, as will be explained further on.

As explained previously, the step of deriving information element from such a contact list can comprise first looking up a given party identifier in the "party ID" field, and then extracting a predetermined further piece of information from a predetermined other field. For example, if the party identifier is +49 12345678 and the procedure in step 11 is arranged to extract the piece of information from the "name" filed, then step S11 would comprise deriving the piece of information "Paul" for the given party identifier.

The derived information element may be generated in any suitable or desirable way, e.g. it could comprise only the extracted piece of information ("Paul" in the above-described example), or could combine the extracted piece of information with further information, such as the original party identifier and/or a piece of information identifying the third party C with which the contact list is associated from which the supplementary piece of information was extracted. Naturally, this is only an example, and other examples for generating an information element will be described further on.

The basic method shown in FIG. 1 can be embodied in a variety of ways. Especially, the determination of the identifier for identifying the third party C, whose contact list is to be accessed, can be done in a variety of ways. According to a preferred example shown in FIG. 2, the procedure first accesses the contact list BL of party B in step S20. It may be noted that in the context of the present example and in general (except where specifically indicated otherwise) the designations "party A" and "party B" are completely symmetrical, i.e. do not imply a contacting or contacted party. As such the party B mentioned in step S20 may have any role in the communication, i.e. can be the contacting or the contacted party. In following step S21 an identifier for identifying the contact list CL is determined from the contact list BL of party B. In other words, the automatic access procedure determines a party identifier in contact list BL, and uses this identifier for finding an associated contact list of a third party. The procedure for selecting an entry in contact list BL of party B can be arranged in any suitable or desirable way, e.g. an entry can be chosen at random. Further examples for determining an identifier CI of the third party C on the basis of the contact list BL of the second party B will be given in connection with the examples of FIGS. 3 and 4.

Figure 2:
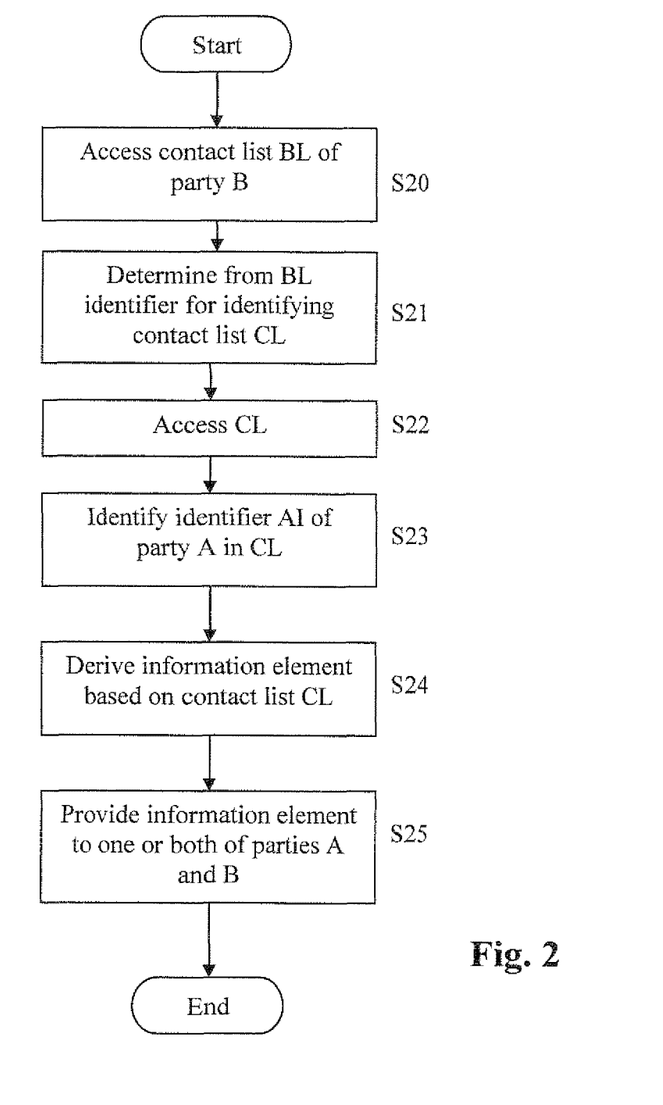
FIG. 2 shows a flow-chart of a further method embodiment of the present invention.

Returning to the method of FIG. 2, the contact list CL of third party C is accessed in step S22. In step S23 the party identifier AI of party A (i.e. the other party in the communication) is identified in contact list CL. Then, in step S24 an information element is derived on the basis of the contact list (like in step S11 of FIG. 1), and in step S25 the information element is provided to one or both of parties A and B, like in step S12 of FIG. 1.

It is noted that step S24 (like S11) can be arranged in any suitable or desirable way with respect to deriving an information element, e.g. if the outcome of step S23 is such that there is no entry for party A in the contact list CL of third party C, then the derived information element could e.g. be blank or contain an indication that no entry was found.

Figure 3:
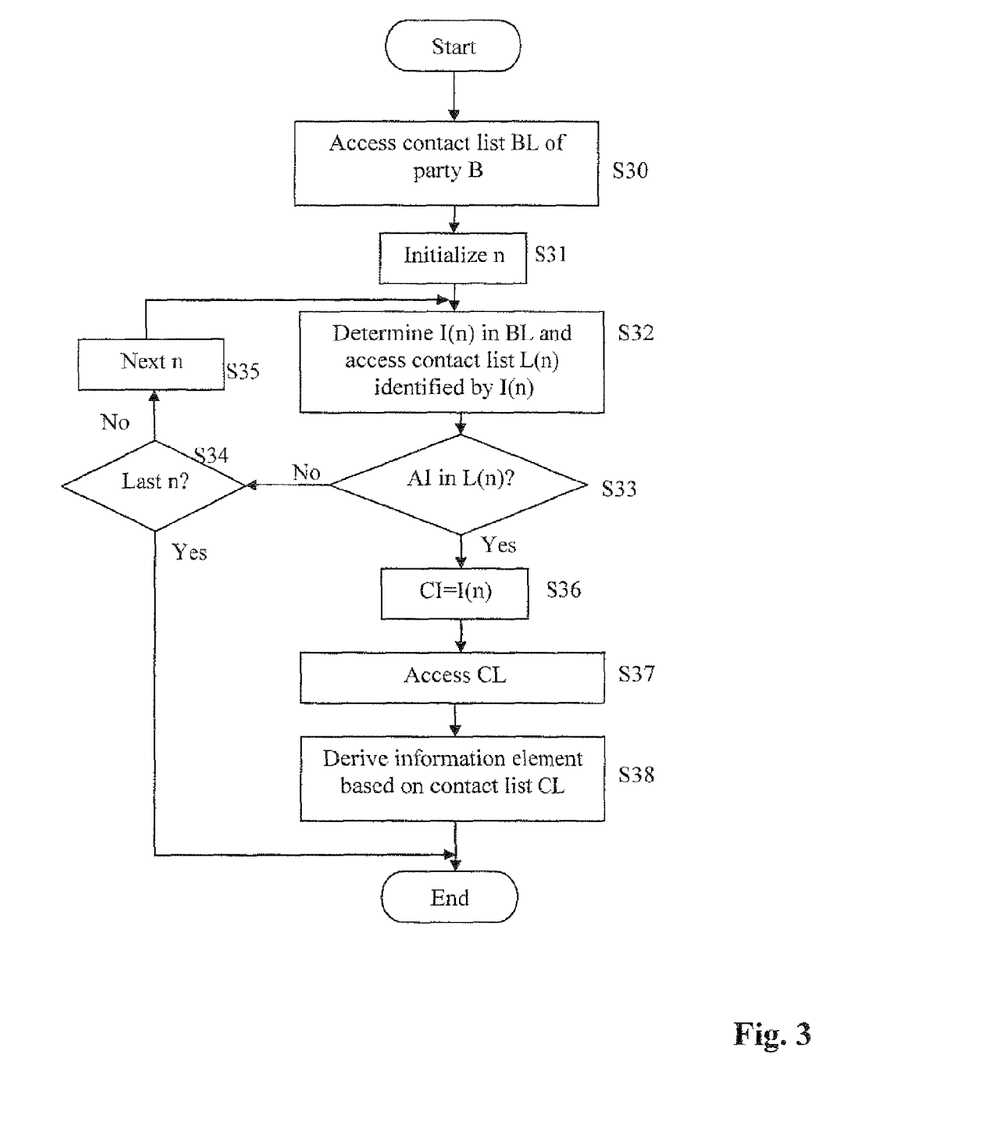
FIG. 3 shows a flow-chart of a further method embodiment of the present invention.

FIG. 3 shows an embodiment corresponding to steps S20 to S24 of FIG. 2, i.e. a procedure for accessing a third party contact list and deriving an information element. In step S30 the contact list BL of party B is accessed. In step S31 a counter referred to as n is initialized. Then, in step S32, a first identifier I(n) associated with n in contact list BL is determined and a corresponding contact list L(n) identified by I(n) is accessed. For example, it can simply be a counter starting at 1 and step S32 consists in accessing the n-th entry of contact list BL. Alternatively, the entries in contact list BL could be grouped according to some form of preference, and counter n could be used to address individual elements of specific groups. For example, the contact list BL could be maintained in such fashion that only a sub-set of entries is available for the search procedure, and step S32 only accesses such entries, which could e.g. be marked in a specific way, for example by a predetermined flag. If the contact lists use the above mentioned "degree of separation" field, then groups could e.g. be defined on the basis of the degree of separation value. For example, the search could be restricted to entries having a degree of 1. Or a set of groups could be defined, where a first group that is first searched could be defined by the degree of 1, a second group to be searched if the search in the first group yields no result, could be defined by entries having a degree of 2, etc.

In a next step S33 it is determined whether the identifier AI of party A is to be found in contact list L(n). If this is not the case, then the procedure goes to step S34, in which it is determined whether counter n is at its end or whether further entries are available for examination. If further entries are available, then the procedure goes to step S35, in which n is set to the next value, and the procedure loops back to step S32. If the outcome of step 934 is such that no further value of n is available, then the procedure ends.

On the other hand, if the outcome of step S33 is such that the identifier AI of party A is found in contact list L(n), then the corresponding identifier I(n) is chosen as the third party identifier CI (see step S36) and the corresponding contact list CL is accessed in step 937, in order to appropriately derive an information element on the basis thereof in step S38, as described previously.

Figure 4:
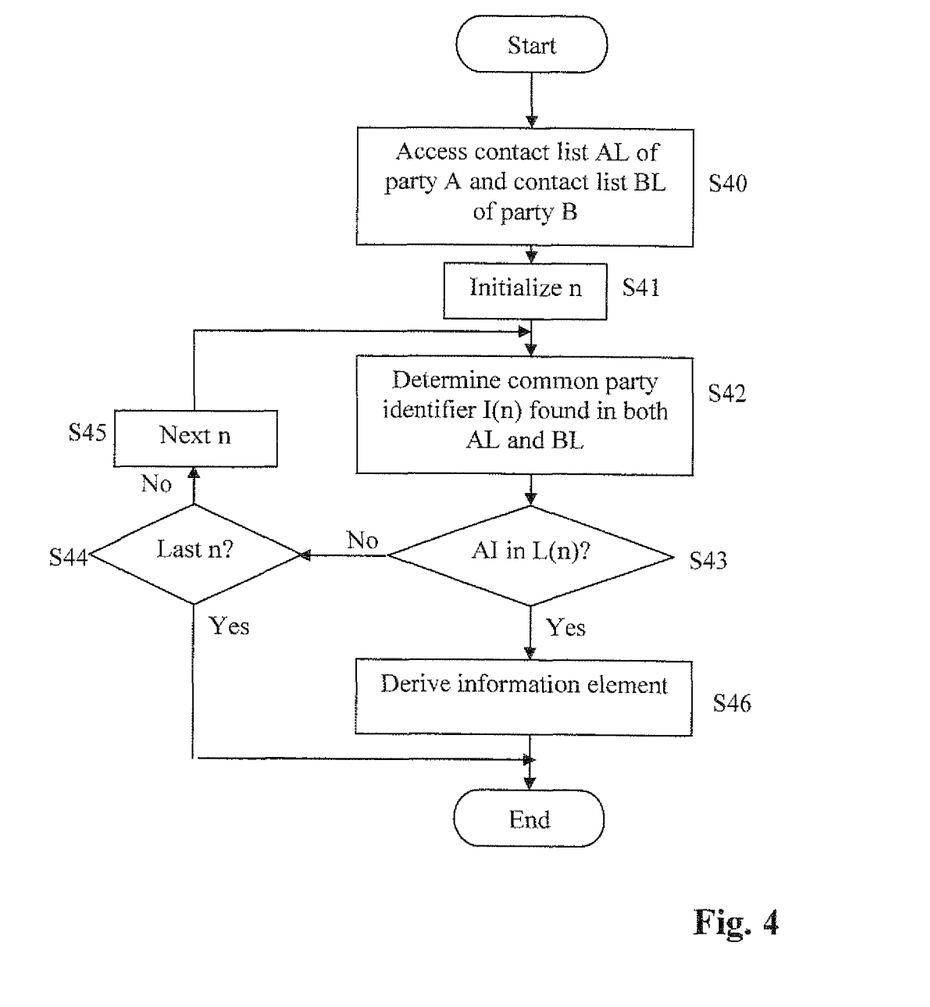
FIG. 4 shows a flow-chart of yet another method embodiment of the present invention.

FIG. 4 shows a further embodiment, in which again a possible implementation of steps S20 to S24 is shown. In step S40 the procedure for automatically accessing the third party contact list first accesses the contact list AL of party A and the contact list BL of party B. Then, in step S41, again a counter n is initialized. In step S42 a common party identifier I(n) is determined in both contact lists AL and BL. In other words, it is looked for a party identifier (such as a telephone number) that is identically found in both the contact list AL of party A and the contact list BL of party B.

Then, in step S43 the corresponding contact list L(n) is accessed, in order to determine whether AI is present therein. If this is the case, then the information element is derived in step S46 on the basis of the entry associated with AI in L(n). If there is no entry for AI in L(n), then the procedure goes to step S44, in which it is determined if counter n is at its last value or whether further values are available (i.e. whether there are further common party identifiers in both contact lists AL and BL). If a further value is available, then the value of n is set to the next value in step S45 and the procedure loops back to step S42.

In searching for a common party identifier, it is again possible to define specific search strategies that make use of information in the contact lists under consideration. For example, if the contact lists use a "degree of separation field", then the degree of separation value can be used to prioritize the search. Similar to the previous example, a first group could be defined of all entries having a degree of 1 (i.e. people known directly), and the search be designed to first go through this group. If this proves unsuccessful (i.e. no common identifier is found), then the search could go through a second group defined by the entries having a degree of 2, etc.

As already indicated previously, the procedures described in FIGS. 2, 3 and 4 are applicable regardless of the role that party A and party B play in the communication comprising A and B. Preferably, they are applied such that party A is a contacting party (e.g. a calling party of a voice call) and party B is a contacted party (e.g. a called party of a voice call). In this case, the party identifier AI of party A will typically be communicated during the communication set-up and thus received by e.g. entity 8 of FIG. 8 in the network. The communication set-up messages (e.g. an INVITE message) will also comprise the identifier ET of the contacted party. However, it is noted that in the general situation of FIGS. 2 to 4 the two party identifiers AT and ET can be provided in any suitable or desirable way, e.g. in dedicated request messages from one party in order to obtain information regarding the other party.

Returning to the example of party A being contacting party and party B being a contacted party, the present invention can furthermore be embodied in such a way that a triggering of the procedures shown in FIGS. 1 to 4 can be made dependent on the condition that the contacting party identifier AI is not to be found in the contact list BL of contacted party B. There can be different reasons for an identifier to not be findable, e.g. because there is no entry with that identifier, or there is an entry with the identifier, but that entry is blocked against being accessed. In the case that the party identifier AI of the contacting party can be found in contact list BL of party B, it is simpler and more practical for the contacted party B to make use of the known information presentation function according to which presentation information associated with the contacting party identifier AI is taken from its own contact list BL, such that there is no need to query a third party contact list CL. This function of checking whether AI is to be found in BL can be present in the network, e.g. in a control element of the network, and/or in the communication equipment of party B.

As already mentioned, the information element derived on the basis of contact list CL of third party C can be arranged in a number of ways. For example, it may comprise extracting one or more parts of further party information associated with the calling party identifier AI, e.g. extracting the entry in the "name" field (see FIG. 6) associated with the calling party identifier AI. Then, these one or more parts can be placed in the information element and be provided to the contacted party B.

As an alternative or addition to this procedure, the automatic deriving of the information element based on the contact list may also comprise determining whether the contact list CL of the third party C comprises an entry associated with the calling party identifier AI and generating the information element as comprising a confirmation indication and the third party indicator CI if the entry is present. The idea of this embodiment is that one must not necessarily extract any information from the third party contact list CL, as some third parties C might not want that their personal entries are exploited, e.g. because they use nicknames or other confidential information. Nonetheless, by providing the contacted party with an indication that the contacting party is entered in the contact list of third party C, and at the same time identifying the third party C, useful information beyond the generic contacting party identifier AI can be provided to the contacted party.

Figure 5:
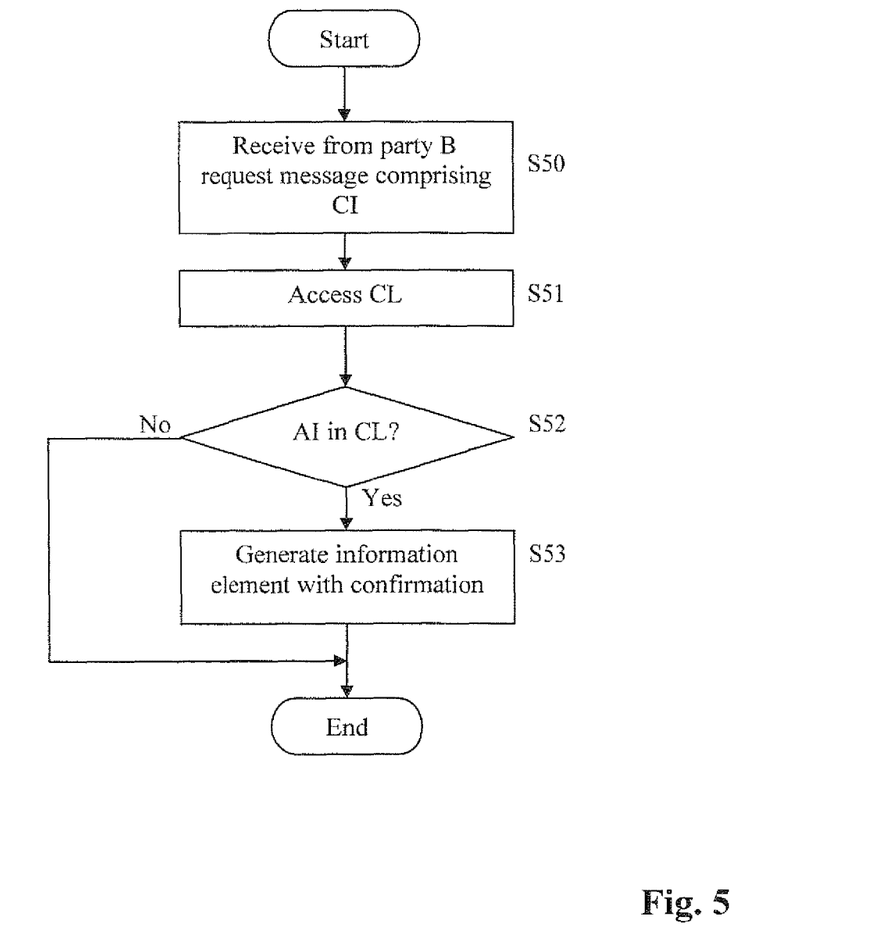
FIG. 5 shows a flow-chart of yet another method embodiment of the present invention.

Now a further embodiment of the present invention will be described, which can be combined with any of the previous embodiments. FIG. 5 is a flowchart showing a method of authentication or confirmation based on the general concept of the present invention. In FIG. 5 the procedure for automatically accessing the contact CL of the third party C comprises receiving a request from one of the first and second party, which request message comprises an indicator for identifying the third party C. This is shown in step S50, in which it is assumed that party B sends a request message comprising the third party identifier CI to a dedicated network entity, such as entity 8 shown in FIG. 8. The procedure for automatically deriving an information element on the basis of the contact list CL then accesses the third party contact list CL in step S51 and determines in step S52, whether or not the party identifier AI of the other communication party A is present in contact list CL. It is noted that the party identifier AI may also be contained in the request message received in step S50, or may be obtained otherwise in the network, e.g. from the general communication control function handling the communication between A and B. If the outcome of step S52 is such that the party identifier AI of party A is present in contact with CL of third party C, then step S53 generates an information element confirming this presence. This generated information element is then sent to the requesting party B and possibly also the other communication party A. In accordance with this embodiment, it is possible for one part of a communication to check information provided by the other party. Namely, it is e.g. possible that party A has identified itself as an acquaintance of party C, where party B knows party C but does not know party A. In this case, the procedure of the present invention can be used to automatically conduct a confirmation on request, e.g. in a mobile telephone context it is possible to send the appropriate confirmation message to party B as an SMS displayed to party B during the ongoing communication between A and B.

According to a further embodiment of the present invention, the procedure of automatically deriving an information element on the basis of the contact list CL of the third party C comprises an authorization step of determining whether it is allowed to derive an information element on the basis of the contact list CL of the third party C. In other words, it is preferable to additionally provide a type of authorization function that permits or blocks the generation of an information element on the basis of the third party contact list CL. Such a function can then be adjusted by the third party C in a desired way, e.g. in such a way that access is only allowed to certain entries, that access is only allowed for certain parties A or B, and/or that only specific information parts (e.g. only the contents of specific fields) may be extracted, whereas other access and/or extraction is denied.

Figure 7:
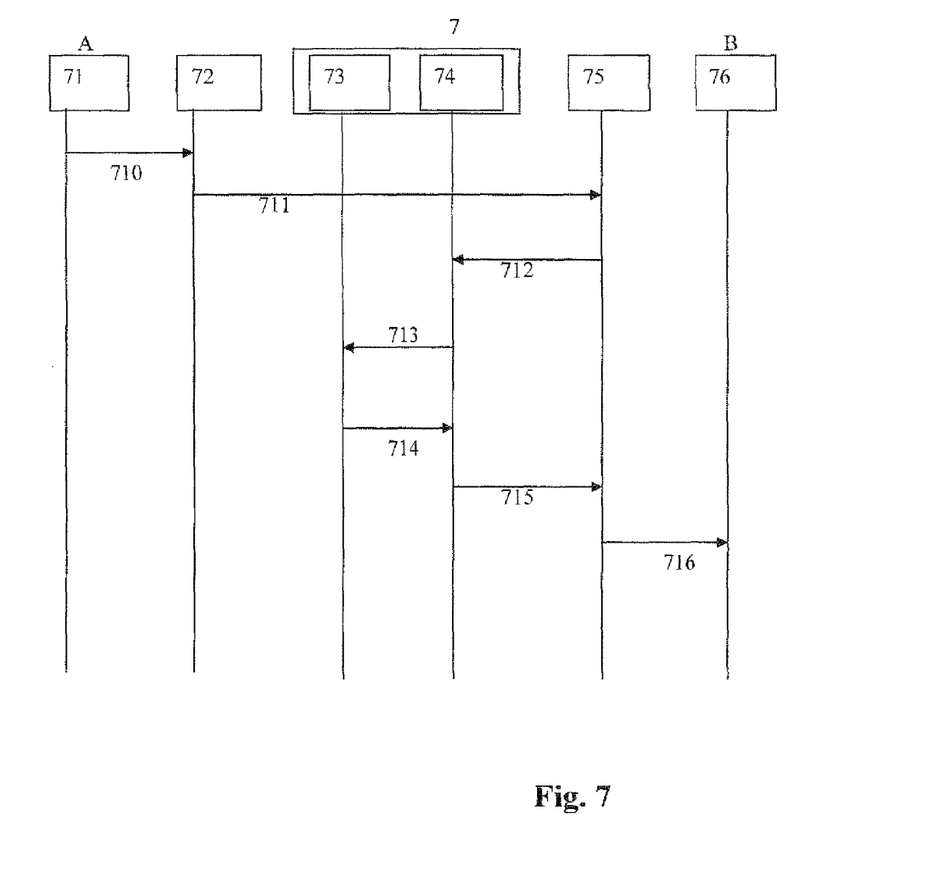
FIG. 7 shows a schematic representation of message and signalling exchanges in an embodiment of the present invention.

FIG. 7 schematically shows the signalling exchange between different network entities and communicating parties A and B during a communication set-up, e.g. a voice call set-up. Element 71 represents the user equipment (e.g. a mobile phone) of party A and reference numeral 76 refers to the user equipment (e.g. a mobile phone) of party B. The user equipment entities 71 and 76 are connected by an appropriate network schematically represented by elements 72 and 75, which will be different entities depending on the details of the network and network technology. Also, they do not intend to represent a complete network or details of communication set-up, as this is basically known and plays no role for the present invention. As an example, in the case of an IF multimedia subsystem (IMS) network, entity 72 may be the Call Session Control Function (CSCF) associated with party A while entity 75 is the CSCF associated with party B. On the other hand, if the connecting network is a mobile telephone network, then entity 72 may be the Mobile Switching Center/Visitor Location Register (MSC/VLR) associated with party A, and entity 75 can be the MSC/VLR associated with party B. Naturally, elements 72 and 75 could also be appropriate corresponding parts of another form of telephone network, such as a public switched telephone network (PSTN).

FIG. 7 is an example of a communication set-up. Initially, party A sends an INVITE message 710 towards party B, which arrives at control element 72. Control element 72 then forwards this invitation in message 711 towards user B, i.e. to the corresponding control element 75 associated with party B. The control entity 75 associated with party B may then trigger a function according to which entity 7 is contacted, which is an example of the system explained previously in connection with FIG. 8. Message 712 comprises identifiers of parties A and B. Entity 7 comprises an entity 74 arranged for implementing one or more of the above mentioned methods. Entity 74 can e.g. be a function implemented as software in the control unit 81 described previously in connection with FIG. 8. It may e.g. be referred to as an extended call-ID function. It can for example first check whether party A is known to party B, i.e. whether the party identifier AI of party A is present in the contact list BL of party B. If this is the case, then preferably no further action is undertaken, as party B does not require any further information on party A.

On the other hand, as shown in the example of FIG. 7, in which it is assumed that party A is unknown to party B, then one of the above mentioned procedures is conducted, in order to access a contact list CL of a third party C. In the example of FIG. 7, entity 7 furthermore comprises an entity 73, which is an authorization function for allowing or blocking access and/or extraction of information from contact list CL of third party C. The process of invoking the authorization function 73 is shown as message 713 and the response is message 714. If the response is such that authorization is given, then an information element is generated and provided to control entity 75 in message 715. For example, an information element extracted from the contact list CL of party C can be added as a call-ID element in the call set-up procedure and in this way forwarded from control entity 75 to party B in INVITE message 716. Thus, party B can be provided with extended party related information associated with party A, despite the fact that party B does not know party A and has no corresponding entry in its contact list.

It is noted that the term "entity" refers to an element of a network that provides a certain functionality, where an entity can be provided within a single physical unit, such as a server, or can be spread out over several physical units.

As already mentioned in connection with FIG. 8, the above described methods may be implemented as computer programs in a programmable processor. Consequently, the present invention can also be embodied as a computer program comprising computer code parts arranged for conducting the inventive methods when executed on a processor, and as a computer program product carrying such computer program parts, e.g. as a data carrier.

Although the present invention has been described with reference to specific embodiments, these only serve to better illustrate the general concepts, and the scope of protection is defined by the appended claims. Reference numerals in the claims only serve to make the claims easier to understand, but have no limiting effect.

The invention claimed is:

1. A method of providing communication party related information to a party of a communication that comprises a first and a second party, said method comprising:
   a procedure for automatically determining a party identifier of a third party, which is different from said first and said second party, on the basis of a contact list associated with said second party, and for automatically accessing a contact list of said third party,
   a procedure for automatically deriving an information element on the basis of said contact list of said third party and at least one of a party identifier of said first party and a party identifier of said second party, and
   a procedure for automatically providing said information element to one or both of said first and second party,
   wherein said procedure for automatically determining a party identifier of a third party comprises determining a common party identifier found in both a contact list associated with said first party and said contact list associated with said second party, the common party identifier being the third party identifier.

2. The method of claim 1, wherein said communication is one of a voice call, a data call and a real-time chat.

3. The method of claim 1, wherein said procedures are implemented in an entity of a communication network handling said communication.

4. The method of claim 1, wherein said procedure for automatically deriving an information element comprises identifying the party identifier of said first party in said contact list of said third party.

5. The method of claim 4, wherein said first party is a contacting party and said second party is a contacted party, and said method furthermore comprises receiving a contacting party identifier associated with said contacting party and triggering said determining of said third party identifier if said contacting party identifier is not to be found in said contact list associated with said second party.

6. The method of claim 1, wherein said procedure for automatically deriving said information element based on said contact list of said third party comprises extracting one or more parts of further party information associated with a party identifier of said first party and placing said one or more parts in said information element.

7. The method of claim 1, wherein said procedure for automatically deriving said information element based on said contact list of said third party comprises determining whether said contact list of said third party comprises an entry associated with a party identifier of said first party and generating said information element as comprising a confirmation indication and said third party indicator if said entry is present.

8. The method of claim 1, wherein said procedure for automatically accessing said contact list of said third party comprises
   receiving a request message from one of said first and second party, said request message comprising an indicator for identifying said third party, where said procedure for automatically deriving an information element on the basis of said contact list of said third party comprises
   determining whether said contact list of said third party comprises an entry associated with an identifier of one of said first and second party and
   generating said information element as comprising a confirmation indication if said entry is present.

9. The method of claim 1, further comprising an authorization step of determining whether it is allowed to derive and/or provide said information element on the basis of said contact list of said third party.

10. A system for providing communication party related information to a party of a communication that comprises a first and a second party, said system comprising:
   a control unit coupled to a persistent memory storing instructions for use by the control unit; and
   a database storing contact lists of users,
   the control unit arranged for:
      automatically determining a party identifier of a third party, which is different from said first and second party, on the basis of a contact list associated with said second party, and for automatically accessing a contact list of said third party,
      automatically deriving an information element on the basis of said contact list of said third party and at least one of a party identifier of said first party and a party identifier of said second party, and
      automatically providing said information element to one or both of said first and second party,
      wherein automatically determining a party identifier of a third party includes determining a common party identifier found in both a first contact list associated with said first party and said contact list associated with said second party, the common party identifier being the third party identifier.

11. The system of claim 10, wherein said communication is one of a voice call, a data call and a real-time chat.

12. The system of claim 10, wherein said system is in an entity of a communication network handling said communication.

13. The system of claim 10, wherein said control unit is arranged for identifying a party identifier of said first party in said contact list of said third party.

14. The system of claim 13, wherein said first party is a contacting party and said second party is a contacted party, and said control unit is arranged for receiving a contacting party identifier associated with said contacting party and triggering said determining of said third party identifier if said contacting party identifier is not to be found in said contact list associated with said second party.

15. The system of claim 10, wherein said control unit is arranged for extracting one or more parts of further party information associated with a party identifier of said first party and placing said one or more parts in said information element.

16. The system of claim 10, wherein said control unit is arranged for determining whether said contact list of said third party comprises an entry associated with said party identifier of said first party and generating said information element as comprising:

a confirmation indication; and said third party indicator if said entry is present.

17. The system of claim 10, wherein said control unit is arranged for receiving a request message from one of said first and second party, said request message comprising an indicator for identifying said third party, and for determining whether said contact list of said third party comprises an entry associated with an identifier of other one of said first and second party and for generating said information element as comprising a confirmation indication if said entry is present.

18. The system of claim 10, wherein said control unit is arranged for determining whether said control unit is allowed to derive and provide said information element on the basis of said contact list of said third party.

* * * * *

UNITED STATES PATENT AND TRADEMARK OFFICE
CERTIFICATE OF CORRECTION

| | | |
|---|---|---|
| PATENT NO. | : 9,225,829 B2 | |
| APPLICATION NO. | : 12/741943 | |
| DATED | : December 29, 2015 | |
| INVENTOR(S) | : Agúndez Dominguez et al. | |

It is certified that error appears in the above-identified patent and that said Letters Patent is hereby corrected as shown below:

Specification

In Column 3, Line 5, delete "DI" and insert -- BI --, therefor.

In Column 4, Line 42, delete "then." and insert -- then --, therefor.

In Column 6, Line 5, delete "934" and insert -- S34 --, therefor.

In Column 6, Line 11, delete "937," and insert -- S37, --, therefor.

In Column 6, Line 56, delete "ET" and insert -- BI --, therefor.

In Column 6, Line 58, delete "AT and ET" and insert -- AI and BI --, therefor.

In Column 8, Line 38, delete "IF" and insert -- IP --, therefor.

Claims

In Column 12, Line 11, in Claim 17, delete "of other" and insert -- of --, therefor.

Signed and Sealed this
Nineteenth Day of April, 2016

Michelle K. Lee
*Director of the United States Patent and Trademark Office*